United States Patent [19]

Kaas et al.

[11] 4,336,218

[45] Jun. 22, 1982

[54] METHOD FOR RECOVERING RESIDUAL MATTER ACCUMULATED IN THE PRODUCTION AND MACHINING OF STEEL

[76] Inventors: Werner Kaas, Buchenstr. 173, D-4220 Dinslaken; Hans-Helmut Borggrefe, Herzogenweg 10, D-4156 Willich 1; Klaus-Dieter Unger, Forstwaldstr. 684, D-4150 Krefeld 1, all of Fed. Rep. of Germany

[21] Appl. No.: 199,684

[22] Filed: Oct. 22, 1980

[30] Foreign Application Priority Data

Oct. 24, 1979 [DE]  Fed. Rep. of Germany ....... 2942899

[51] Int. Cl.$^3$ .............................................. B22F 3/06
[52] U.S. Cl. ..................................... 264/111; 264/122
[58] Field of Search ................................ 264/111, 122

[56] References Cited

U.S. PATENT DOCUMENTS 4,116,679  9/1979  Pietsch ................................ 264/122
4,213,779  7/1980  Caswell .............................. 264/111

FOREIGN PATENT DOCUMENTS 1229798  4/1971  United Kingdom ................ 264/111

Primary Examiner—James R. Hall
Attorney, Agent, or Firm—Kenyon & Kenyon

[57] ABSTRACT

A method of recovering particulate matter having a high metal content and including dust resulting from production of steel and chips from machining of steel. The method includes selecting the chips that have a length of 7 to 30 mm; mixing the dust and the selected chips in the ratio of about 70:20 to 30:60 pts/pts; wetting the dust, before or after it has been mixed with the chips, to a moisture content of 3 to 8% by weight to hydrate free lime in the dust; and mixing the dust and selected metal chips with a suitable binder; and forming the mixture into briquettes.

16 Claims, No Drawings

METHOD FOR RECOVERING RESIDUAL MATTER ACCUMULATED IN THE PRODUCTION AND MACHINING OF STEEL

BACKGROUND OF THE INVENTION

1. Field of the Invention

The invention relates to a method for recovering residual matter which accumulates in the production and in the machining of steel. The material recovered is in the form of metal-containing dust and chips and, after the addition of a binder, is formed into briquettes.

2. The Prior Art

The value of recovering residual matter generated when steel is produced and when it is machined has been recognized for a long time but its importance has increased greatly in recent times due to developing shortages of raw materials and the difficulties of finding suitable disposal sites for material that is not recovered. The residual matter has a high metal content consisting of iron and expensive alloying elements, such as chromium and nickel, and recovering the components reduces the need for more expensive raw materials. To this must be added that the transportation and disposal of the residual matter, which is usually present in the form of fine dust, raises problems with respect to pollution of the environment.

Thus, numerous proposals have been made for reprocessing residual matter with the goal of re-using it in the production of steel.

From DE-AS No. 23 61 742, for instance, a method is known, according to which spherical briquettes are made from four components, namely, sludge, a coarse component with a grain size $>100$ $\mu$m, a fine component with a grain size $<100$ $\mu$m and a binder. These components are mixed and pressed, but the mixture must be heated, prior to being pressed, to a temperature at which the binder becomes liquid. A disadvantage of this known method is that the finest component, which has a grain size of less than 100 $\mu$m and is very difficult to process, is limited to a maximum of 25% of the briquette mixture. The reason that this is unfortunate is that dust in this grain size spectrum constitutes by far the largest part of the waste products accumulated. In addition, a continuously operating platform conveyor oven is required to heat the mixture so as to liquify the binder. According to the method described in DE-AS No. 23 61 742, sludge is an absolutely essential component of the mixture, and thus it is not immediately clear how the residual matter, which accumulates only in the dry state can be processed for recovery.

The same thing applies to the method described in DE-AS No. 25 31 457, in which the sludge component must first be dehydrated down to a water content of 2 to 15% by weight before the binder and the dust component are admixed. This latter method requires heating the briquettes to 350° C. to remove the residual moisture and is, therefore, relatively elaborate and expensive.

According to DE-AS No. 24 27 619, finely divided wastes that contain carbon and at least 5% iron are mixed with a bituminous binder, the mixture is formed into briquettes, and the briquettes are treated for 30 to 90 minutes with an oxygen-containing gas at 170° to 320° C. This heat treatment, however, is expensive and is to be applied only: (a) to the wastes accumulating in the production of iron and steel in powder or dust form, i.e., blast-furnace flue dust, converter dust, rolling scale, coke dust and flux; or (b) to the scrap from foundries and machine shops, namely, lathe and drill press chips. Mixtures of fine with coarse grain fractions are not treated by this method. If chips are used, their dimensions should not exceed 6 mm; if necessary, they are to be comminuted, which increases the cost.

OBJECTS AND SUMMARY OF THE INVENTION

It is an object of the invention to provide a method to process metal-containing dust and metal chips, as the residual metal-containing materials obtained in the largest quantities in the production and machining of steel, in a manner as simple and cost-effective as possible.

The invention is based on the discovery that the metal-containing dust collected in filters contains, among other things, free lime, which, upon extended storage of the briquettes formed from the dust, causes the briquettes to decay because they absorb moisture. It has also been found that in pressing briquettes of metal-containing dust and metal chips, certain mixing ratios must be observed in order to facilitate pressing.

To solve the stated problem, it is proposed, according to the present invention, that the metal-containing residual matter in dust form, which is accumulated in the production and treatment of steel and is collected in filters in the dry condition, is moistened with 3 to 8% and preferably 4 to 7%, by weight, of water, or with a corresponding amount of steam, for hydrating the free lime contained in the dust. After the hydration of the free lime contained in the dust, the danger of premature disintegration of the residual-matter briquettes no longer exists.

According to one advantageous embodiment of the method according to the invention, the dust is to be mixed with metal chips, the length of which is 7 to 30 mm and, preferably, 7 to 15 mm, the ratio of dust to chips, by weight, being in the range from 70:20 to 30:60. In addition, 2 to 10% by weight, and preferably 3 to 6% by weight, of a binder is added to the mixture. Contrary to the method known from German patent publication AS No. 23 61 742, supra, in which the dust content is to be limited to 25% maximum, a higher dust content of 30 to 70% can be processed in the method according to the invention. This is of great importance because of the relatively high mass content of dust as compared to the contents of residual matter in other forms.

The increased amount of dust that can be processed into briquettes is based not only on the hydration of the free lime, as has been described above, but on the fact that metal chips of a given length are to be used. This length is not to be smaller than 7 mm nor larger than 30 mm. Metal chips with a length in this range form an ideal matrix in which the dust, provided with the binder, settles so that the cohesion of the briquettes is assured, if a suitable binder, such as bitumen or water glass, is used. According to this invention, the binder is used without water, which must always be present with the binder in prior art methods in order to render the mixture of residual matter capable of being processed.

However, according to the invention, water may be added in an amount of 2 to 8% by weight, and preferably, 3 to 6% by weight, which permits the binder content to be reduced accordingly. It is advantageous to adjust the mixture to a residual moisture content corresponding to the water content in the hydration treatment.

Sludge accumulated in wet filters may also be used if it is converted into dry dust by drying and comminuting.

The method according to the invention is distinguished from the above-mentioned known methods in that durable briquettes made of the types of residual matter which are produced in the largest quantities, namely, dust and metal chips, can be produced in a relatively simple and cost-effective manner.

DETAILED DESCRIPTION OF THE INVENTION

The method according to the invention will now be explained in greater detail with the aid of the following examples. While Examples 1 and 2 were carried out by the method according to the invention, a sample pressed from dust only, was used for comparison in Example 3.

EXAMPLE 1

Electric-filter dust from the production of stainless steel was moistened in an intensive mixer to 6% water and then set aside for a period of 3 days. During this time, the lime contained in the electric-filter dust was hydrated to calcium hydroxide.

After the hydration, 70 parts by weight of electric-filter dust were mixed with 30 parts by weight of stainless steel chips having a length in the range of 10 to 25 mm, which had been produced by grinding ingot slabs of stainless steel. The mixture was adjusted to 6.3% moisture, and 5% cellulose powder (dry component of the sulfite waste) was added.

Then, the mixture was fed by means of a dosing and pre-densifier worm to a cylinder briquetting press. With a circumferential cylinder velocity of 0.33 m/s, a set pressure of 28 kN for each centimeter of cylinder width and a briquette volume of the briquetting cylinders of 10 cm$^3$, briquettes with a specific gravity of 3.53 g/cm$^3$ were produced.

The dropping strength of the briquettes produced was 3.5 m after leaving the press. After the briquettes were hardened at room temperature for 3 days, a cold compression strength of the briquettes of 115 daN/briquette was measured.

EXAMPLE 2

In this example, the ratio of the electric-filter dust to the grinding chips was set to 50:50. The other data may be seen from the following Table.

As shown in the Table, it was possible to achieve a dropping strength of the briquettes of 4.0 m after leaving the press. The cold compression strength of the briquettes after hardening for 3 days was 175 daN/briquette.

EXAMPLE 3

In this reference example, which does not correspond to the invention, no metal chips were added to the filter dust. The other data may be found in the following Table.

The dropping strength of these briquettes after leaving the press was only 0.7 m. The cold compression strength after hardening for 3 days was 50 daN/briquette.

The embodiment examples show that the binding-in of metal chips, with the effect of a reinforcement, leads to an unusually high dropping strength of the resulting briquettes and to a very good cold compression strength of the hardened briquettes.

TABLE

| Process Steps | Example 1 | Example 2 | Example 3 |
|---|---|---|---|
| Moisten E-filter dust to (% H$_2$O by wt.) | 6 | 6 | 6 |
| Reaction time (days) | 3 | 3 | 3 |
| Mixing; ratio E-filter dust/chips (pts/pts) | 70/30 | 50/50 | 100/0 |
| Residual moistening of moisture to (% H$_2$O by wt.) | 6.3 | 5.4 | 7.3 |
| Binder addition, cellulose powder (% by wt.) | 5 | 3 | 7 |
| Briquetting with cylinder pressure (kN/cm of cylinder length) | 28 | 26 | 24 |
| Briquette volume (cm$^3$) | 11 | 11 | 11 |
| Quality of the briquettes | | | |
| (a) Dropping strength after leaving press Dropping height (m) | 3.5 | 4.0 | 0.7 |
| (b) Cold compression strength after hardening for 3 days (daN/briquette) | 115 | 175 | 50 |
| Specific gravity of the briquettes (g/cm$^3$) | 3.53 | 3.84 | 2.85 |

We claim:

1. In a method in which residual matter of the type accumulated as metal-containing dust and chips in the production and machining of steel is to be formed into briquettes, with the addition of a binder, the steps comprising:
    selecting the chips to have a length of about 7 to 30 mm; 3% to 8% by weight of water;
    allowing the moistened dust time to hydrate free lime contained in the dust; and
    forming a mixture of the dust, binder, and chips into briquettes.

2. The method according to claim 1 in which the water is in the form of steam.

3. The method according to claim 1 in which the water is added to metal-containing dust to make the weight of the water content thereof 4% to 7% of the weight of the dust.

4. The method according to claim 1 in which the dust and the chips are mixed before the dust is moistened to hydrate the free lime.

5. The method according to claim 1 in which the dust is moistened and the free lime is hydrated before chips are mixed with the dust.

6. The method according to claim 1 in which the ratio of parts of dust to parts of metal chips is approximately in the range from 70:20 to 30:60, and the weight of the binder is approximately 2 to 10% of the total amount of the mixture.

7. The method according to claim 6 in which the amount of the binder added is 3 to 6% by weight in comparison to the total amount of the mixture.

8. The method according to claim 1 in which the mixture of dust and chips from which the free lime has been hydrated contains approximately 2 to 8% by weight of water at the time the binder is added.

9. The method according to claim 8 in which the mixture contains approximately 3% to 6% by weight of water at the time the binder is added.

10. The method according to claim 8 in which the mixture is adjusted in the hydrating treatment to a residual moisture corresponding to the water content.

11. The method according to claims 1 comprising, in addition:

briquetting the mixture in a cylinder press at a cylinder pressure of 20 to 80 kN/cm of cylinder width; and hardening the briquettes by storage at room temperature for a period of about 1 to 2 days.

12. The method according to claim 11 in which the cylinder pressure is 30 to 40 kN/cm of cylinder width.

13. The method according to claim 1 in which the dust component of the mixture is filter dust accumulated in the production of stainless steel.

14. The method according to claim 1 in which the chips are grinding chips produced in the grinding a member of the group consisting of ingot, ingot slab, blocks, plates and sheets of stainless steel.

15. The method according to claim 1 in which the binder comprises cellulose powder, a molasses-lime mixture, and soda.

16. The method according to claim 1 in which the binder comprises cellulose powder, a molasses-lime mixture and bitumen.

* * * * *

UNITED STATES PATENT AND TRADEMARK OFFICE
CERTIFICATE OF CORRECTION

PATENT NO. : 4336218
DATED : June 22, 1982
INVENTOR(S) : WERNER KAAS ET AL

It is certified that error appears in the above—identified patent and that said Letters Patent is hereby corrected as shown below:

Column 4, line 31, after "mm;" insert --moistening the metal-containing dust to contain approximately--.

Column 4, line 67, change "claims" to --claim--.

Signed and Sealed this

Twenth-eighth Day of September 1982

[SEAL]

Attest:

GERALD J. MOSSINGHOFF

Attesting Officer    Commissioner of Patents and Trademarks